United States Patent [19]
Hoshino et al.

[11] Patent Number: 5,202,947
[45] Date of Patent: Apr. 13, 1993

[54] OPTICAL FIBER COMPONENT OPTICAL COUPLER AND METHOD OF PRODUCING THEREOF

[75] Inventors: Sumio Hoshino; Masumi Ito; Masayuki Shigematsu; Hiroo Kanamori, all of Yokohama; Hisasi Izumita, Mito, all of Japan

[73] Assignees: Sumitomo Electric Industries, Ltd., Osaka; Nippon Telegraph and Telephone Corporation, Tokyo, both of Japan

[21] Appl. No.: 798,913

[22] Filed: Nov. 29, 1991

[30] Foreign Application Priority Data
Nov. 29, 1990 [JP] Japan .................... 2-331535

[51] Int. Cl.$^5$ ............................ G02B 6/26; G02B 6/28
[52] U.S. Cl. .................................................. 385/123
[58] Field of Search ............................... 385/123–125; 359/341; 372/6

[56] References Cited
U.S. PATENT DOCUMENTS

| 4,586,784 | 5/1986 | Tremblay et al. | 385/43 |
| 4,589,725 | 5/1986 | Dyott | 385/42 |
| 5,007,698 | 4/1991 | Sasaki et al. | 385/123 X |
| 5,027,079 | 6/1991 | Desurvire et al. | 372/6 X |

FOREIGN PATENT DOCUMENTS

| 0103382 | 3/1984 | European Pat. Off. |
| 0136047 | 4/1985 | European Pat. Off. |
| 0345957 | 12/1989 | European Pat. Off. |
| 0368196 | 5/1990 | European Pat. Off. |
| 0415167 | 3/1991 | European Pat. Off. |

Primary Examiner—Akm E. Ullah
Attorney, Agent, or Firm—Cushman, Darby & Cushman

[57] ABSTRACT

There is disclosed an optical component capable of amolifying function by itself and a method of producing thereof. The component includes a light amplifying portion therein and the light amplifying portion includes active elements which serves the light amplification. In the producing method, the amplifying portion is, for example, formed by utilizing sol-gel method to introduce the active elements.

17 Claims, 3 Drawing Sheets

OPTICAL FIBER COMPONENT OPTICAL COUPLER AND METHOD OF PRODUCING THEREOF

BACKGROUND OF THE INVENTION

1. Field of the Invention

The present invention relates to optical fiber component, an optical coupler and a method of producing thereof.

2. Related Background Art

Because rare earth elements and transition metals such as erbium (Er) can amplify light, they can be used in optical fiber laser and optical fiber amplification. The light in this optical fiber propagates essentially through the core of the optical fiber, therefore, rare earth elements are normally added to the core. The rare earth elements pumped by exciting light have the ability to amplify light. However, such rare earth elements cause light loss in signaling light, and adjusting the quantity of rare earth elements doped into the core is extremely difficult. Even though the light in the optical fiber propagates essentially within the core, it partially leaks out through the cladding. This indicates the possibility to realize light amplification even when the cladding of the optical fiber is doped with rare earth elements. However in this case, as the cladding has a lower light power level than the core, it necessitates a high concentration of doping with rare earth elements.

A vapor phase epitaxy method and a solution impregnation method, etc. are known as methods to add rare earth elements as active element to the optical fiber. In the vapor phase epitaxy method, first, chloride of rare earth element is heated and the resultant vapor is allowed to flow into a reaction tube together with material gas of silica glass, for example, silicon tetrachloride. Then, glass is synthesized. Next, a rod is produced using the glass added with rare earth elements and after being made transparent a cladding material or a core material is formed to produce optical fiber. There is another method to form the optical fiber. In the method, first, a group of silica particles is heated and being made transparent. When the group of particles being made transparent, rare earth elements are added to the glass by exposing the group of silica particles to a vapor of rare earth elements.

In the solution impregnation method, silica particles are impregnated in an alcoholic solution or aqueous solution of rare earth elements, then by sintering the silica particle group after evaporating the solvent, rare earth elements are added to the glass, to obtain optical fiber.

However, in the methods of producing optical fibers described above, in the case of vapor phase epitaxy method, the doping concentration is limited to the range from several ppm to several tens ppm due to the low vapor pressure of rare earth elements. Accordingly, a satisfactory light amplification ability is not exhibited by the optical fiber which is produced by the method described above such as the cladding is doped with rare earth elements. In the solution impregnation method, higher concentration of several thousands ppm is possible. However because the impregnation quantity is dispersed due to apparent density distribution of the silica particle group, it is difficult to obtain an optical fiber in which the rare earth elements are added uniformly to the cladding in a high concentration.

Unlike the methods described above, a sol-gel method enables rare earth elements to be added in a high concentration and prevent concentration association. Accordingly when optical fiber is spun using a glass material obtained by the sol-gel method as a base material for the cladding, optical fiber components might be produced in which the rare earth elements is added uniformly to the cladding in a high concentration.

The light in the optical fiber propagates essentially within the core, but it partially leaks out through the cladding and thus propagates within the cladding, as hereinbefore described. Particularly if an optical fiber has a thinner portion in a part of the cladding portion, the light propagating within the cladding has a relatively large light power density at that thinner portion. Because of this, a relatively large light amplification ability might be exhibited by partially forming the optical fiber thinner even when active elements are added onto the cladding over the entire length of the optical fiber.

However, the light propagating within the cladding becomes relatively large at the portion where the optical fiber is partially formed thinner, thereby the light often leaks outside the cladding. At a portion in the cladding except for the thinner portion contributing to light amplification ability, propagated light of the cladding suffers loss due to rare earth elements. In particular, when the optical fiber components are doped with rare earth elements in a relatively long portion with higher concentration, the total light loss is not negligible, and causes difficulty in exhibiting satisfactory light amplification ability.

SUMMARY OF THE INVENTION

It is an object of the present invention to provide an optical fiber component including an optical fiber comprising a core portion formed of transparent material with a first refraction factor, a cladding portion formed of transparent material with a refraction factor smaller than the first refraction factor and provided embracing the core portion, a thinner portion existing in at least one portion of the cladding portion in a longitudinal direction of the optical fiber, and a light amplifying portion provided at the portion where the thinner portion is made up, the light amplifying portion containing active elements having light amplification ability.

It is another object of the present invention to provide a method of producing an optical fiber component comprising the steps of: forming an optical fiber which comprises a core portion formed of translucent material with a first refraction factor and a cladding portion formed of transparent material with a refraction factor smaller than the first refraction factor by spinning; forming a thinner portion at least one portion of the cladding portion in a longitudinal direction of the optical fiber; and providing a light amplifying portion at the portion where the thinner portion is formed, the light amplifying portion containing active elements that can amplify light.

It is further another object of the present invention to provide an optical coupler formed by fusing a plurality of optical fibers, each of which comprises a core portion formed of transparent material with a first refraction factor and cladding portion formed of transparent material with a refraction factor smaller than the first refraction factor and provided embracing the core portion, wherein a light amplify portion is provided at the cladding potions thereof, and active elements having a light amplification function are added to the light amplify portion.

It is more further another object of the present invention to provide a method of producing an optical coupler comprising the steps of: fusing a plurality of optical fibers, each of which comprises a core portion formed of translucent material with a first refraction factor and a cladding portion formed of transparent material with a refraction factor smaller than the first refraction factor and provided embracing the core portion, in cladding portions of the plural optical fibers among them and forming a light amplifying portion containing active elements capable of amplifying light onto the portion where the clad portions have been fused together.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

The embodiments of the present invention will be explained referring to the appending drawings as follows.

Figure 1:
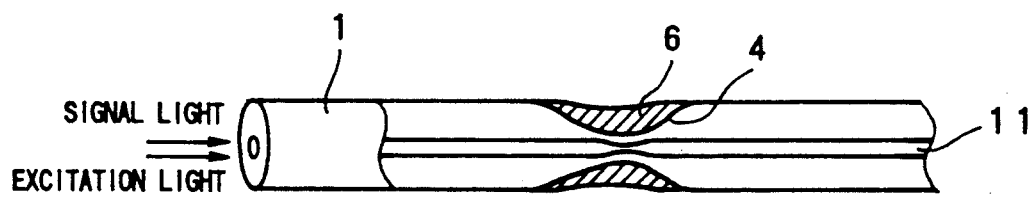
FIG. 1 is a sectional view of an optical fiber component according to an embodiment of the present invention.

As shown in FIG. 1, a glass coat 6 added with active elements as a light amplifying portion adheres to periphery of a thinner portion of a cladding portion (hereinafter referred to as a thinner portion) 4 of a spun optical fiber 1. The glass coat 6 has active elements added uniformly in a high concentration. Hereinafter in this explanation of the invention, it is assumed that the cladding portion does not include a light amplifying portion.

Figure 2A:
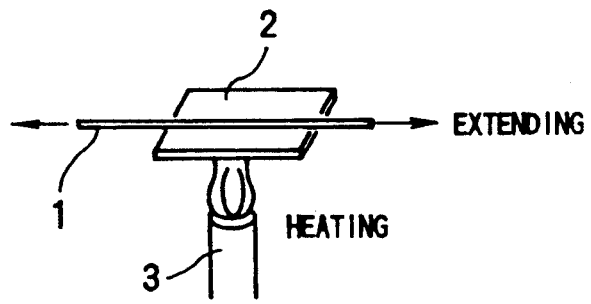
FIG. 2A to FIG. 2D are drawings showing the steps for production processes of an optical fiber component according to an embodiment of the present invention.
Figure 2B:
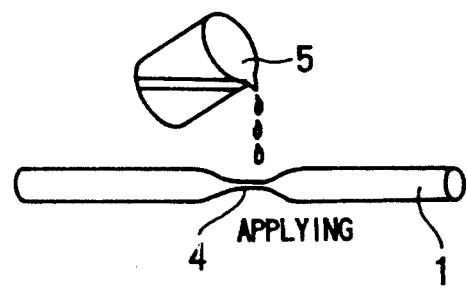
Figure 2C:
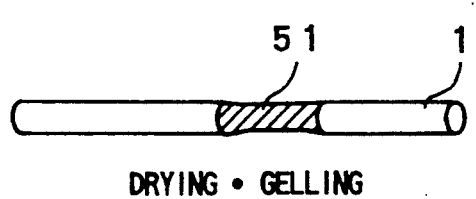
Figure 2D:
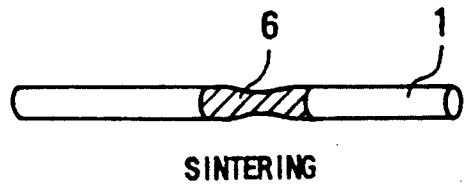

FIGS. 2A to 2D are steps showing the production processes of the optical fiber component. As shown in FIG. 2A, the optical fiber 1 spun from a pre-form formed with a clad base material and a core base material is heated by a burner flame 3 through silica plate 2 and extended. From this process, the optical fiber 1 is provided with a thinner portion 4 as shown in FIG. 2B. Sol, which is added an active element (hereinafter referred to as active element addition sol 5) having light amplifying ability is produced, and the active element addition sol 5 is then adhered to the thinner portion 4 of the optical fiber 1 previously formed, to form a sol-like coat 51. The sol-like coat 51 is dried to be converted into a gel as shown in FIG. 2C. This optical fiber 1 is heated and further sintered as shown in FIG. 2D, thus transparent glass coat 6 is formed.

As described above, the optical fiber component with cross-sectional structure shown in FIG. 1 is produced. The functions of the optical fiber component obtained by the production processes described above will be explained referring to FIG. 1. In the drawing, when signal light and exciting light are incident to the core portion 11 of optical fiber 1, the light leaks out onto the glass coat 6 adhered to periphery of the thinner portion 4 of the cladding, then, the active element inside the glass coat 6 is pumped by the exciting light. At this time, the signal light also leaks out on glass coat 6, and exhibit a so-called light amplification ability by induced emission.

Figure 3:
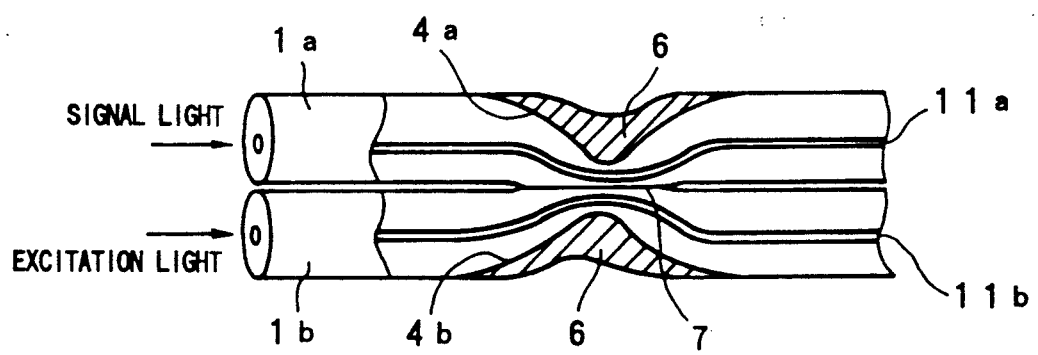
FIG. 3 is a sectional view of an optical coupler according to an embodiment of the present invention.

Using the methods hereinbefore described, an optical coupler composed of a plural of optical fibers may be produced. FIG. 3 is a sectional view of the construction of the optical coupler according to the present invention. As shown in the drawing, the glass coat 6 forming a light amplifying portion is adhered to the periphery of thinner portions 4a and 4b where two optical fibers 1a and 1b are fused. The active elements are added to this glass coat 6 uniformly in a high concentration. In this case, the two optical fibers 1a and 1b are heated and extended, and are fused together at the respective thinner portions 4a and 4b, which are formed previously. Furthermore, the glass coat 6 with the active elements added is adhered to the thinner portions 4a and 4b. According to this process, the optical coupler shown in FIG. 3 may be obtained.

In the optical coupler shown in FIG. 3, if the signal light is incident to a core portion 11a of the optical fiber 1a and the exciting light is incident to another core portion 11b of the optical fiber 1b, then the light leaks out on the glass coat 6 adhered to the periphery of respective thinner portions 4a and 4b at a fused portion 7 to exhibit the light amplifying ability as hereinbefore described. At this time, as a cladding portion is not specially doped with rare earth elements, there is no light loss from that portion.

The following is a method for preparing and applying the sol-gel to the optical fiber. First, the optical fiber 1 is heated by the burner flame 3 through the silica plate 2, then, a thinner portion 4 is formed in the longitudinal direction of the optical fiber 1. Next, tetramethoxy silane 10 ml, ethyl alcohol 15 ml, water 10 ml, hydrochloric acid (12 M) 0.12 ml, polyethylene glycol 0.8 g, erbium chloride ($ErCl_3 \cdot 6H_2O$) 0.19 g are mixed and stirred for half an hour by a magnetite stirrer. The above optical fiber 1 is impregnated in active element addition sol 5 thus produced, thereafter the optical fiber 1 is taken out and sol-like coat 51 is formed on the thinner portion 4 mentioned above. Then the resultant product is dried for about 12 hours in the atmosphere, after that, the dried product is heated for an hour at 500° C. in an electric furnace to sinter it, and after making the coat 51 transparent, the glass coat 6 is obtained.

In this way, optical fiber components capable of satisfactorily exhibiting a light amplification ability have been obtained.

The active elements are not limited to Erbium employed in the present embodiment. For example, any of the elements described below may also be employed, namely: Sc (scandium), Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Tm (thulium), Yb (ytterbium), Lu (lutetium), Ti (titanium), V (vanadium), Cr (chromium), Mn (manganese), Fe (iron), Co (cobalt), Ni (nickel), Cu (copper), Zr (zirconium), Nb (niobium), Mo (molybdenum), Tc (technetium), Ru (rutherium), Rh (rhodium), Pd (palladium), Ag (silver), Hf (hafnium), Ta (tantalum), W (tungsten), Re (rhenium), Os (osmium), Ir (iridium), Pt (platinum), Au (gold), and actinoid. In addition, the glass coat forming the light amplifying section, is preferred to have a refraction factor 1% less than that of the cladding. In such a case, the light leaking out to the glass coat easily returns to the core portion from the cladding portion, hence highly efficient light amplification and light propagation are possible.

In addition, the forming of the thinner portion is not limited to process of heating and extending the optical fiber. For example, the cladding portion of the spun optical fiber may be chemically etched to partially remove the cladding portion so that the thinner portion of transparent material of the cladding portion remains. Alternatively, a part of the cladding portion of the spun optical fiber may be ground to be removed so as to remain the thinner portion of the transparent material of the cladding portion. Furthermore, using a plural of optical fibers formed by the method mentioned above and fusing together respective thinner portions, an optical coupler may also be produced. To the thinner portions thus produced, the sol-like glass with active elements is added as in the foregoing embodiment, and this sol-like glass is further converted into a gel and sintered, to form a transparent glass coat. In this way, optical fiber components capable of satisfactorily amplifying light might be obtained when provided with the light amplifying portion. As hereinbefore described, according to the present invention, the light amplifying portion formed at the thinner portion of the cladding is a glass coat formed by the sol-gel method. Therefore, the active elements are added in high concentration to the portions contributing to the light amplification ability of the optical fiber, thereby obtaining optical fiber components capable of efficient light amplification, laser oscillation, and light propagation. Furthermore, the refraction factor of the light amplifying portion is also made lower than that of the cladding portion, thus the optical fiber components exhibiting light amplification ability more satisfactorily can be formed.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An optical fiber component including an optical fiber comprising:
    a core portion formed of transparent material with a first refractive index;
    a cladding portion formed of transparent material with a second refractive index smaller than said first refractive index and located adjacent to the core portion, having a thin portion, which has a thinner diameter than the cladding portion, in at least a part of the cladding portion in a longitudinal direction of the optical fiber; and
    a light amplifying portion located at the thin portion, the light amplifying portion containing a sol which has active elements having a light amplification ability and a polyethylene glycol.

2. An optical fiber component according to claim 1, wherein the thin portion completely surrounds the core portion in the outer circumferential direction, the light amplifying portion being provided over all of the thin portion.

3. An optical fiber component according to claim 1, wherein the active elements are added to the light amplifying portion uniformly in a high concentration.

4. An optical fiber component according to claim 3, wherein the active element is a rare earth element.

5. An optical fiber component according to claim 3, wherein the active element is a transition metal.

6. An optical fiber component according to claim 1, wherein the light amplifying portion has a lower refractive index than that of the cladding portion.

7. An optical fiber component according to claim 6, wherein the light amplifying portion has a refractive index which is approximately 1 percent less than that of the cladding portion.

8. A method of producing an optical fiber component comprising the steps of:
    forming by spinning an optical fiber having a core portion formed of translucent material with a first refractive index and a cladding portion formed of transparent material with a second refractive index smaller than said first refractive index;
    thinning a portion of the cladding portion in a longitudinal direction of the optical fiber to make a thin portion; and
    penetrating the thin portion of the cladding portion with a sol which has active ions and polyethylene glycol to make a light amplifying portion located at the thin portion.

9. A method of producing an optical fiber component according to claim 8, wherein the thinning step comprises the step of thinning the cladding portion by heating and extending the optical fiber.

10. A method of producing an optical fiber component according to claim 8, wherein the thinning step comprises the step of thinning the cladding portion by chemically etching at least part of the transparent material in the outer circumferential direction of the cladding portion.

11. A method of producing an optical fiber component according to claim 8, wherein the thinning step comprises the step of thinning the cladding portion by mechanically grinding at least part of the transparent material in the outer circumferential direction of the cladding portion.

12. A method of producing an optical fiber component according to claim 8, wherein the light amplifying portion is made of a glass coat with active elements added uniformly.

13. An optical coupler comprising:
    a first core portion made of transparent material with a first refractive index;
    a first cladding portion made of transparent material with a second refractive index smaller than said first refractive index and located adjacent to the first core portion, the first cladding portion having a thin portion, which has a thinner diameter than the first cladding portion, in a longitudinal direction of at least a part of the cladding portion;
    a second core portion made of transparent material with the first refractive index;
    a second cladding portion made of transparent material with the second refractive index and located adjacent to the second core portion, the second cladding portion having a thin portion, which has a thinner diameter than the second cladding portion, in a longitudinal direction of at least a part of the cladding portion, and the thin portion of the first cladding portion is fused to the thin portion of the second cladding portion; and a light amplifying portion located at the fused thin portions and contains a sol which has active ions and polyethylene glycol.

14. An optical coupler according to claim 13, wherein the active ions are uniformly distributed in the sol.

15. An optical coupler according to claim 13, wherein the light amplifying portion has a refractive index lower than that of the fused portion of the cladding portions.

16. An optical coupler according to claim 15, wherein the light amplifying portion has a refractive index approximately 1 percent less than that of the fused portion.

17. A method of producing an optical coupler comprising the steps of:
  forming at least two optical fibers, each of which has a core portion formed of translucent material with a first refractive index and a cladding portion formed of transparent material with a second refractive index smaller than said first refractive index and located adjacent to the core portion;
  thinning a portion of the cladding portion in a longitudinal direction of the optical fiber to make a thin portion on each optical fiber;
  fusing the thin portions together; and
  forming a light amplifying portion onto the fused thin portions by penetrating the fused thin portion with a sol which has active elements capable of amplifying light and polyethylene glycol.

* * * * *